United States Patent [19]

Tschudin-Mahrer

[11] Patent Number: 4,715,473
[45] Date of Patent: Dec. 29, 1987

[54] FOAM ACOUSTIC ABSORPTION MEMBER

[75] Inventor: Rolf Tschudin-Mahrer, Lausen, Switzerland

[73] Assignee: Irbit Research & Consulting AG, Fribourg, Switzerland

[21] Appl. No.: 807,614

[22] Filed: Dec. 11, 1985

[30] Foreign Application Priority Data

Dec. 14, 1984 [DE] Fed. Rep. of Germany ....... 3445656

[51] Int. Cl.$^4$ ................................................. E04B 1/82
[52] U.S. Cl. .................................... 181/286; 264/515; 264/516; 181/288; 181/292; 181/293
[58] Field of Search ................... 249/66 R; 428/304.4, 428/137, 138; 181/286, 288, 291, 292, 293; 264/515, 516

[56] References Cited

U.S. PATENT DOCUMENTS 4,128,683 12/1978 Nomura et al. ..................... 181/290
4,170,674 10/1979 Matsuki .............................. 181/192
4,253,543  3/1981 Johansson .
4,584,232  4/1986 Frank et al. ........................ 181/288

FOREIGN PATENT DOCUMENTS

W08402998 8/1984 European Pat. Off. .
1154923 9/1963 Fed. Rep. of Germany .
2735153 2/1979 Fed. Rep. of Germany ...... 181/288
2937389 4/1981 Fed. Rep. of Germany .
1510712 5/1978 United Kingdom .

Primary Examiner—Bernard Nozick
Attorney, Agent, or Firm—Martin A. Farber

[57] ABSTRACT

A foam acoustic absorption member having a stabilizing layer with perforations and, in order to obtain a simple, stable structural shape of homogeneous resistance to flow, the stabilizing layer (2) is a wide-side wall of a hollow body (K) which wall is pressed, under thermal deformation, against the foam layer (1), the openings in said hollow body consisting of holes (9) punched from the foam side.

1 Claim, 4 Drawing Figures

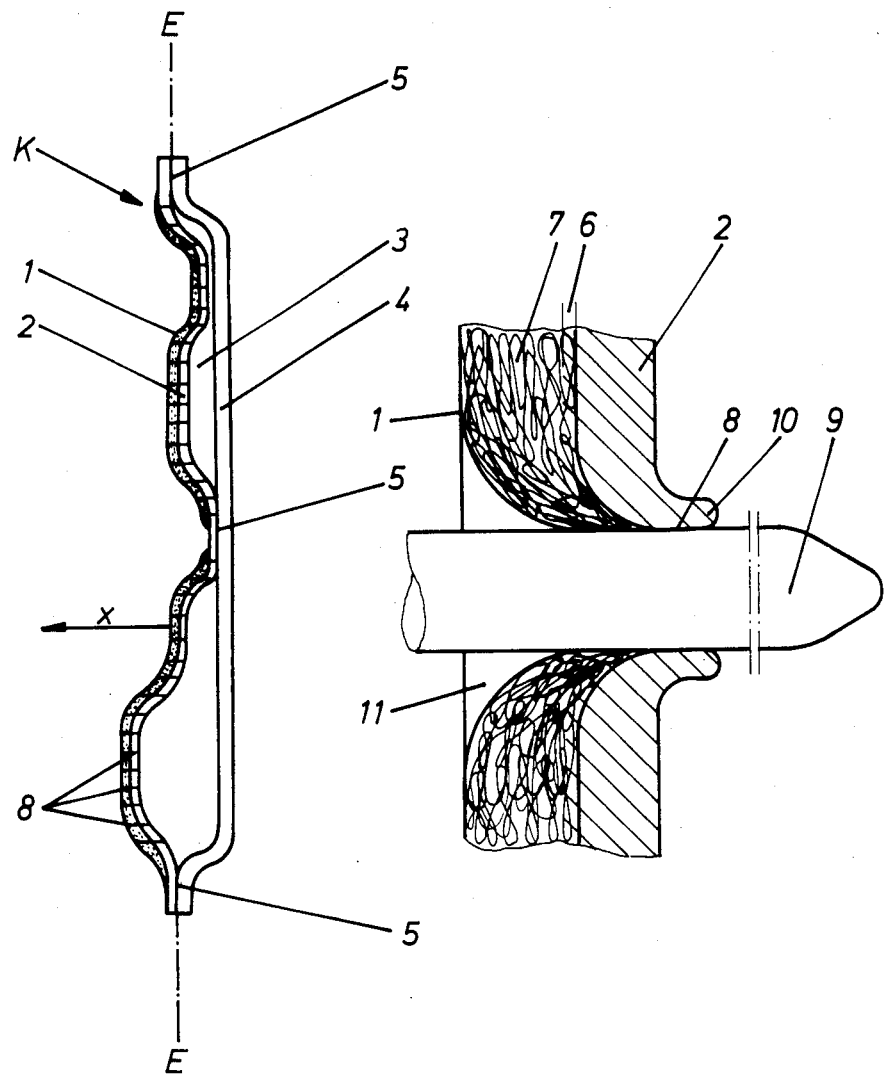

FOAM ACOUSTIC ABSORPTION MEMBER

FIELD AND BACKGROUND OF THE INVENTION

The invention relates to a foam acoustic absorption member with area attachment between a layer of air-pervious foam and a stabilizing layer provided with openings.

It is known to use open-cell foam plastics for the absorption of sound. In order to stabilize the rather thin air-pervious layer of foam plastic a grid is embedded in it. The optimizing of the absorption of sound comprises furthermore also maintaining a certain distance from the reflecting wall or source of sound. As a result of careful adaptation to the intensity of the different sources of noise, considerable cupping deformations may occur, which naturally can strongly stress the inserted grid which provides the openings. Important reinforcing regions may be torn, which is detrimental to stability in use.

SUMMARY OF THE INVENTION

It is an object of the invention, while retaining the principle of the flow-optimized absorber, to provide a foam acoustic absorption member which, even with an extreme relief structure, has a homogenous resistance to flow, and this despite great strength and simple manufacture.

According to the invention, the stabilizing layer is the wide-side wall, pressed with thermal deformation against the foam layer, of a hollow underliner member whose openings consist of holes punched therein from the foam side.

As a result of this development there is created a flow-optimized acoustic absorption hollow member of the introductory type which, with a minimum use of material and high adapatability of shape, provides even further improved efficiency. The use, for instance, of compact thermoplastic material in order to produce the grid layer proves extremely favorable from the standpoint of manufacturing technique. The frequency or density of the holes, which are pierced therein from the plastic side, may even be individualized. In this way, different areas of source of noise are taken into consideration even better.

The hole collars which are possibly produced upon the perforating protrude into the hollow space of the hollow member; they do not require any additional working. The funnel-like hole widenings on the outside even represent particularly effective collectors. The holes can, in particularly economic manner, be taken into account already upon the shaping of the hollow underliner member, although this could also be done in a subsequent or separate operation.

Production can then be effected in traditional molds. Here the blow-mold process is particularly suitable. The layer of foam is inserted into the mold. A tube is extruded. The blow mandrel extends into the tube. The mod closes. The tube is now inflated. It assumes the contour of the mold both with respect to the half of the mold forming the wide-side wall and with respect to the half of the mold bearing the support contour.

After a certain cooling phase, a needle tool is introduced from the foam side to effect the said perforating. After further cooling, the needle tool is retracted. The mold is opened. The finished article drops out.

With the normal hot shaping method one proceeds in the same manner except that, instead of a tubular starting member, two layers are introduced into the mold, one of which forms the stabilizing layer while the other forms the support layer. The shaping may be effected by central pressure or by external vacuum.

An economical mold for the production of such a foam acoustic absorption member may advantageously be shaped in the manner that the wall of the one mold half is provided with openings into which piercing needles are displaceably guided, which needles, emerging beyond the inner contour surface of the mold half, extend up to a position spaced from the inner contour surface of the other mold half, so that the support layer is not also perforated.

BRIEF DESCRIPTION OF THE DRAWINGS

With the above and other objects and advantages in view, the present invention will become more clearly understood in connection with the detailed description of a preferred embodiment, when considered with the accompanying drawings, of which:

FIG. 3 is a view of the product produced by this method, seen in a longitudinal section; and FIG. 4 is a cross-sectional view showing an enlarged detail view of a perforation part.

DETAILED DESCRIPTION OF THE PREFERRED EMBODIMENT

Figure 1:
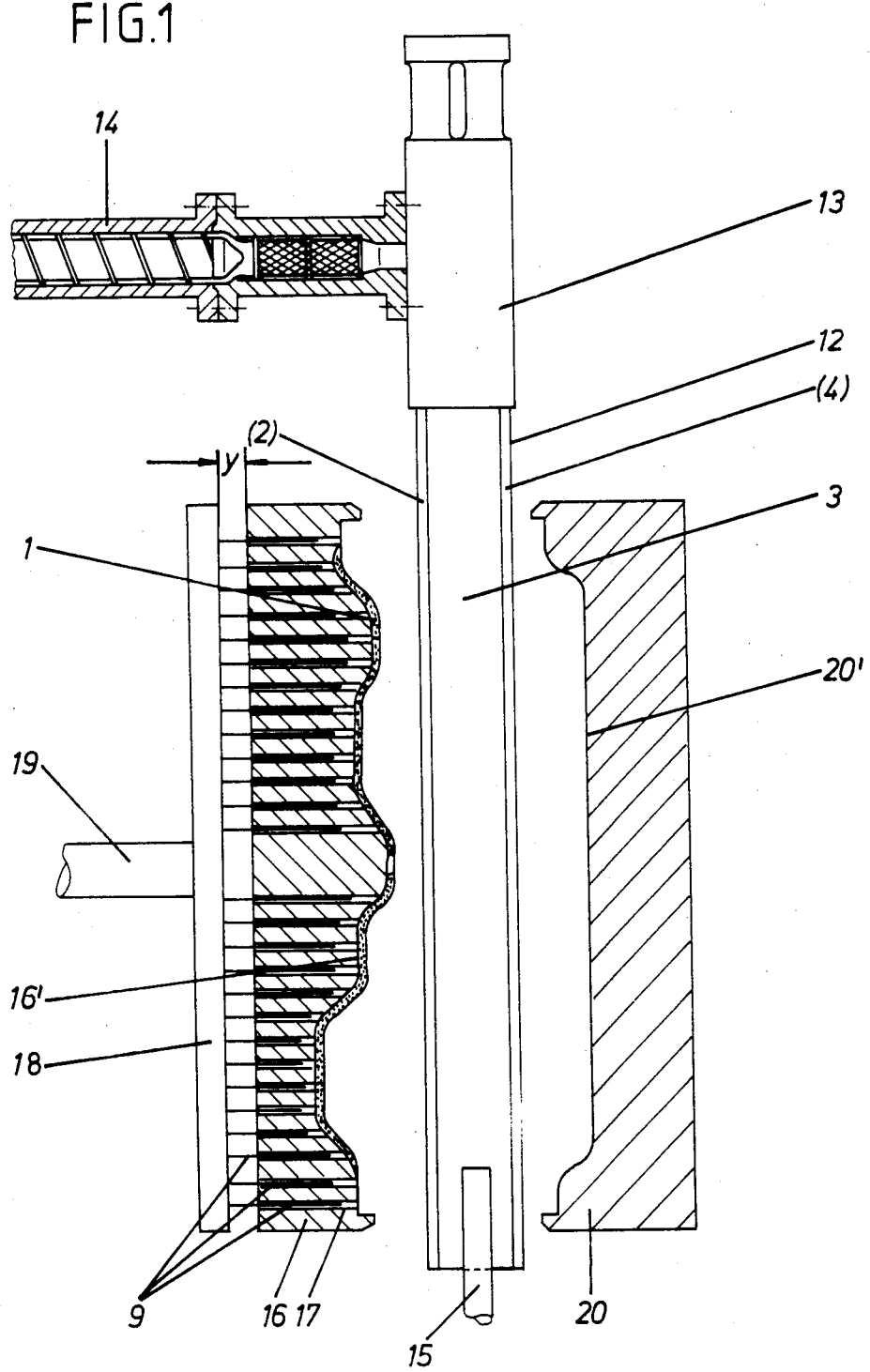
FIG. 1 is a cross-sectional view showing the production of the foam acoustic absorption member by the use of the blow-mold process, with the mold still not closed.

The foam acoustic absorption member shown in FIGS. 3 and 4 is developed as a hollow member K. Its cavity can be further subdivided, i.e. chambered.

The hollow member K is formed of an outer foam layer 1 of open-cell, possibly structurally compacted, air-pervious foam plastic. Said layers lies on the side of the source of noise. A noise-transparent stabilizing layer 2 extends behind it. It is followed by the hollow space 3, which is defined by a so-called support layer 4. The wall of the latter may be thicker than the layer 2.

Stabilizing layer 2 and support layer 4 consist of compact thermoplastic material. Stabilizing layer 2 and support layer 4 are connected together at their edges. The central region of the stabilizing layer 2 is, for instance, also attached to the corresponding region of the support layer so as to obtain a chambering. The places of attachment which are formed by sealing areas bear the reference number 5.

While the stabilizing layer 2 forms extensive steps on both sides, referred to the plane E—E intersecting the edge-side sealing area of joint, the support layer 4 has a substantially merely well-shaped cross-sectional shape, it therefore having a flat bottom. By this offsetting of partial sections out of the general plane E—E, the distance from the acoustically reverberant wall (for instance, the motor hood of an automobile) is varied. Such inward-drawn portions can be cup-shaped or kidney-shaped. A stepped pyramid is also possible. One of these spacings which are to be selected differently as a function of frequency is designated by an x. A detailed description which is hereby incorporated by reference herein is contained in 02998 U.S. Pat. No. 4,584,232 issued Apr. 22, 1986.

The stabilizing layer 2 is pressed with thermal deformation against the foam layer 1. This leads to a firm attachment of the boundary layer 6 of the foam layer 1 facing away from the source of noise to the corresponding surface of the stabilizing layer 2 which forms the one wide-side wall of the underliner hollow body K. The slightly softened plastic penetrates somewhat into the pores 7 of the layer of foam 1 and finds there a high degree of anchoring which, to be sure, does not extend very far in depth, so that the predominant portion of the foam retains its structure, i.e. open pores 7. The securely holding area attachment which is nevertheless present is shown more symbolically by hatching in FIG. 4.

In order to obtain the desired passage of air the stabilizing layer 2 which consists of compact thermoplastic material is provided with holes 8 punched from the foam-layer side. The perforating procedure can be noted from FIG. 2. The needle 9 which enters from the outside of the wide-side wall pulls the material of the stabilizing layer 2 into somewhat collar shape in the direction towards the hollow space 3. The collar is marked with the reference number 10. In front of the collar a funnel 11 is produced on the outer side, both in the foam layer 1 and in the stabilizing layer 2. The diameter of the needle is about 1 mm. The collar 10 of the hole need not be removed since it travels into a zone which is not visible, namely into the hollow space 3.

In order, for instance, to establish a resistance to flow of about 80 Rayl (corresponding to 800 NS/m$_3$), at least 2% of the entire surface of the wide-side wall must be perforated in the case of a foam layer. This means 10 holes of a diameter of 1 mm each every 1000 mm$^2$. In the case of a completely foam-free version, the percentage of holes would have to be about three times greater.

Figure 2:
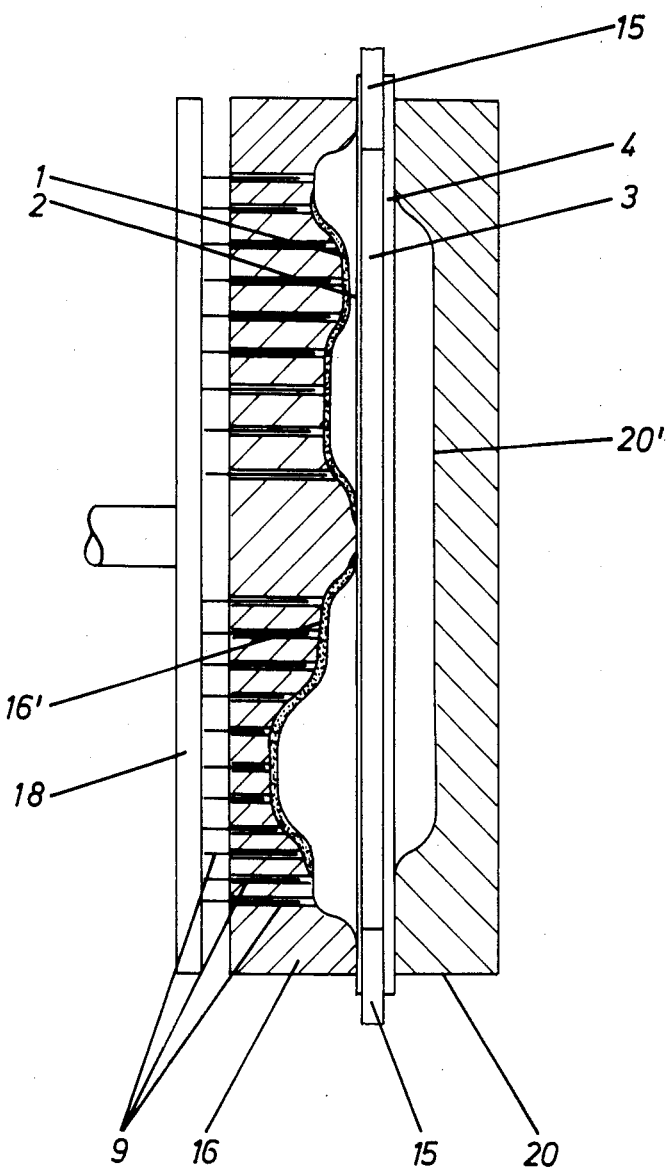
FIG. 2 is a cross-sectional view showing the production of the acoustic absorption member by the use of the hot-shaping process.

As method of manufacture there may be used the blow mold process shown in the drawing in FIG. 1 or the heat-shaping process shown in FIG. 2. While in the last-mentioned process the one wide-side wall which forms the stabilizing layer and the support layer 4 which forms the other wide-side wall consist of separate thermoplastic plates, in the method according to FIG. 1 the two walls are formed from one and the same basic body, namely from a thermoplastic tube 12. For the blow process, preformed tubes can be heated; as a rule, however, the blowing of the hollow bodies is combined directly with the production of the tube. The hot tube emerging from the storage head 13 of the extruder 14 moves into the opened mold W. The latter corresponds in principle to the insertion of the plates in accordance with FIG. 2. A blow mandrel 15 extends into the tube or between the plates. The mold closes. The tube or the plates, which may be fed, for instance, also in endless form, are cut off. The inflation now takes places, as a result of which the hollow body which is formed assumes precisely the inside contour of the mold. A cooling phase now follows. During this cooling phase the holes 9 are punched. The wall of the mold half 16 which shapes the stabilizing layer 2 has openings 17. The openings extend transverse to the plane E—E of the product. Within these openings 17 there extend the perforation needles 9 which are arranged for displacement therein. These needles extend from a common base plate 18 which is controlled and moved via a central rod 19. The displacement stroke y of the ram is such that only the stabilizing layer 2 is perforated. The perforation needles 9 therefore extend beyond the inner contour 16' of the mold half 16 only up to a position which is spaced from the inner contour surface 20' of the other mold half 20.

The mold W cools down further. The needle tool moves back. The mold is opened. The finished part drops out. Instead of a force which presses the tube wall or the plate from the inside against the corresponding mold halves it is, of course, also possible to cause nozzles of a vacuum pump to terminate at the inner surfaces 16', 20' so that, in this way, contour-true impressions of the visible surfaces of the produce are produced.

Herein the term punched also includes pierced or the like.

Although not limited thereto the thermoplastic material may be refering to the stabilizing layer 2, Polyurethane, Polyathylene, Acrylnitril-Butadien-Styrol-Copolymere and Elastomere, such as Polyvinylchlorid. The support layer 4 can be made of the same material as above.

Also the foam layer may for example be made of Polypropylene for example.

I claim:

1. In a foam, acoustic absorption member with area attachment between an air-pervious foam layer and a stabilizing layer provided with openings, the absorption member further comprising a support layer and the improvement wherein the stabilizing layer with the support layer forms a hollow body having a front wall and a back wall defining a hollow space, said hollow space extending transversely along said front wall to allow conformance of said front wall, said foam layer and said support layer to an external surface, said front wall being pressed with thermal deformation against the foam layer, and said openings comprise holes punched in said foam layer and in said stabilizing layer from the side of the foam layer, the hollow space between said front wall and said back wall being large enough to accommodate a collar which may be formed in said front wall about one of said openings.

* * * * *